May 13, 1969   R. M. NIEDZIELSKI ET AL   3,444,350
JET DIFFUSER PLATE FOR ELECTRON BEAM DEVICE
Filed Oct. 23, 1965   Sheet 1 of 2

INVENTORS
ROBERT M. NIEDZIELSKI
DONALD E. POWERS
BY Louis A. Reens
ATTORNEY

United States Patent Office 3,444,350
Patented May 13, 1969

3,444,350
JET DIFFUSER PLATE FOR ELECTRON BEAM DEVICE
Robert M. Niedzielski, Thompsonville, Conn., and Donald E. Powers, Springfield, Mass., assignors to United Aircraft Corporation, East Hartford, Conn., a corporation of Delaware
Filed Oct. 23, 1965, Ser. No. 503,398
Int. Cl. B23k 15/00
U.S. Cl. 219—121                    21 Claims

ABSTRACT OF THE DISCLOSURE

This disclosure relates to the working of materials with a beam of charged particles, and particularly to systems in which the workpieces are preferably located in a pressure environment different from that of the electron beam source. Aligned apertures are provided in the partitions between the different pressure environments for beam passage to the workpiece. A diffusion plate is located in the gas flow into the environment of lower pressure to impede the direct flow of gas through the aligned beam apertures. The diffusion plate improves the maintenance of higher vacuums and reduces the difficulty of working the materials.

---

This invention relates to the working of materials with a beam of charged particles. More particularly, this invention relates to the working of materials with an electron beam where the workpiece is located outside the vacuum surrounding the electron beam source.

An electron beam machine apparatus for working materials is well known as is evidenced by the electron beam machine described in U.S. Patent No. 2,987,610, issued June 6, 1961 to K. H. Steigerwald. Such machines operate by generating a highly focussed electron beam and directing it at a workpiece for welding, cutting, melting, evaporating or machining the material. Among the advantages of using an electron beam is the inertialless control and large energy concentration.

Although in some applications the fact that the workpiece must be located in a vacuum is advantageous, in other applications this requirement is not. For instance, in the working of large workpieces unusually complicated evacuating apparatus and configurations are needed to enable one to utilize the unique advantages of electron beam working of materials. The utilization of a gaseous environment surrounding the workpiece has been considered with various devices suggested as in U.S. Patent Nos. 2,640,948; 2,793,281; 2,816,231; 2,824,232; and 2,-899,556. In many of these prior art approaches, the beam exits to the workpiece through a small aperture. From an economic standpoint, the beam exit aperture must be small in order to minimize leakage of gas into the beam generator region and to thus minimize the size and corresponding cost of the necessary vacuum pumping apparatus. Also, in order to reduce the scattering and attenuation of the electron beam the length of the path through which the beam must travel through a gaseous atmosphere must be as small as possible.

It is recognized that upon the evacuation of intermediate chambers between the electron beam source and the workpiece, a stream of gas enters these chambers from the higher pressure and this gas must be pumped away to avoid the formation of excessive pressures at the electron beam source cathode. This stream of gas tends to flow up along the beam axis into the chamber containing the cathode and increases the pressure there. It has been found that substantial improvement in the vauuum at the cathode can be accomplished by diffusing this stream so that the pump operating in the chamber where the stream is diffused can more efficiently withdraw the stream of gas and prevent its entering the high vacuum region surrounding the cathode.

Accordingly, it is an object of this invention to work materials in a gaseous environment with a beam of charged particles.

It is a further object of this invention to substantially reduce the vacuum surrounding the cathode of an electron beam out-of-the-vacuum apparatus by diffusing the stream of gas enteirng evacuated chambers.

It is a further object of this invention to provide a diffusion of the stream of gas entering from the workpiece environment to improve the pumping efficiency in the evacuated chamber interposed between the electron beam source and the workpiece.

It is still another object of this invention to diffuse a stream of gas entering a chamber of lower pressure from a higher pressure environment to reduce the scattering, attenuation and arcing of a beam of charged particles when passing through the chamber.

These and other objects of this invention are accomplished by interposing a diffuser plate in the path of a beam of charged particles to deflect and diffuse the stream of gas entering the aperture of the evacuated chamber in which the diffuser plate is located.

This invention may be better understood and its numerous advantages will become apparent to those skilled in the art by reference to the following description and the accompanying drawings.

Figure 2:
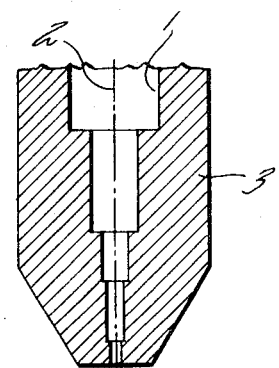
FIGURE 2 shows the side view of the embodiment of FIGURE 1 together with the side view of the high vacuum chamber containing the electron beam source.

In FIGURE 2 a high vacuum chamber 1 is shown which encloses the electron beam source, not shown, and is evacuated to at least a pressure below $10^{-3}$ torr. As previously mentioned, this high vacuum is required in order to prevent arcing at the cathode region and increase the life of the cathode. The pumping mechanism for evacuating the chamber 1 is not shown and is conventional. The electron beam 2 generated by the cathode is transmitted through the bullet-shaped section 3 and enters the evacuated chamber 4 at the beam exit 5.

Figure 1:
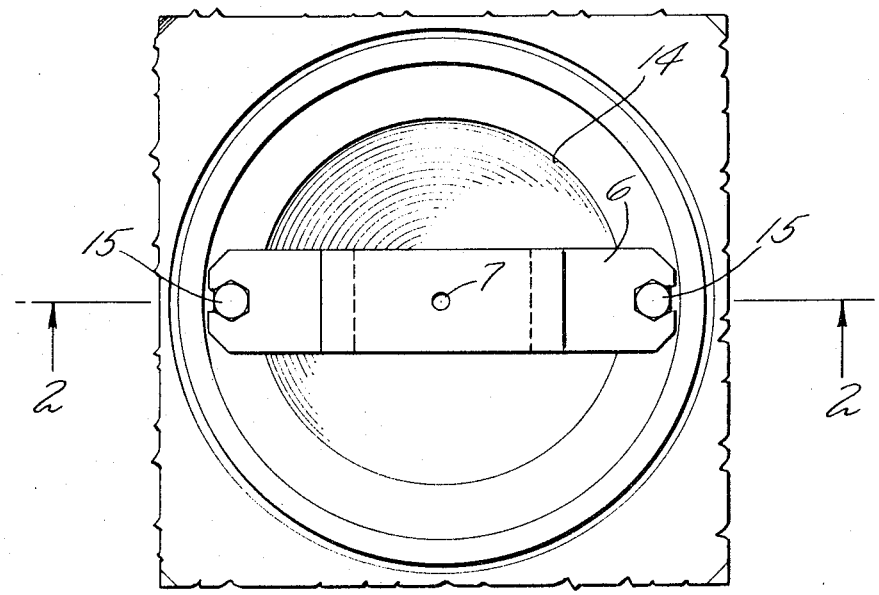
FIGURE 1 shows a top view of a first embodiment of this invention.
Figure 7:
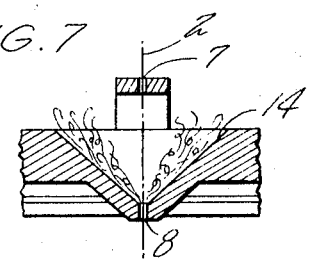
FIGURE 7 shows another side view of the embodiment of FIGURE 2.
Figure 7:
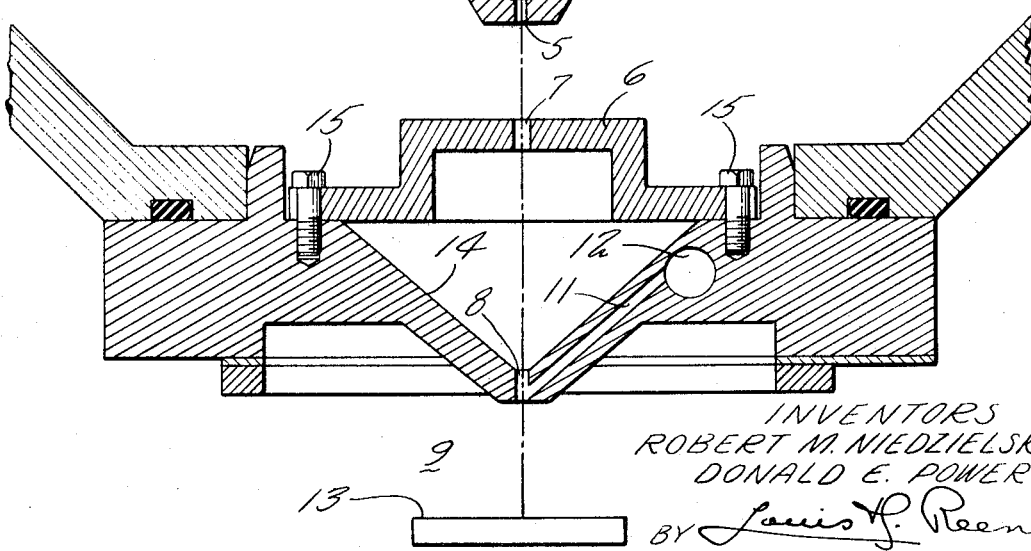

The evacuated chamber 4 is evacuated by a conventional pumping mechanism, not shown, to a pressure which may be higher than that of the highly evacuated chamber 1. In line with the beam exit 5 and within the evacuated chamber 4 is the diffuser plate 6 having a beam aperture 7 for passing the electron beam. Further in line with the electron beam is the aperture 8 cut into a conically shaped wall of chmaber 4. The aperture 8 interconnects the evacuated chamber 4 with the workpiece environment 9. Adjacent the aperture 8 is a tube 11 for interconnecting a high pressure gas source 12. This high pressure source 12 is used to provide a high pressure gas flow towards the workpiece 13 and across the aperture 8 to augment the pressure gradient between the workpiece environment 9 and the evacuated chamber 4. This high pressure gas flow improves the pressure gradient established across the aperture 8. Furthermore, the use of the high gas flow reduces the thickness of the pressure gradient so that the scattering and attenuation of the beam after passing through the aperture 8 occurs to a substantially lesser degree. Despite the presence of the pressure gradient, some flow of gas enters through the aperture 8, the evacuated chamber 4 and tends to flow along a line generally coaxial with the electron beam 2. Although this flow of gas is substantially thicker than the beam 2, it tends to enter chamber 1 and limit the vacuum level attainable therein. In order to reduce this flow of gas, the diffuser plate 6 is interposed between the aperture 8 and the beam exit aperture 5 so that the gas flow may be deflected around the diffuser plate 6 and is diffused into chamber 4. As is shown in FIGURE 1, the diffuser plate 6 covers but a small portion of the conically shaped member 14. Hence, as may be seen in FIGURE 7 in the other side view of the diffuser plate 6, the gases flowing up through the aperture 8 tend to be deflected and diffused to the sides. The diffusion of these gases facilitates their removal by the pumping mechanism operating on the evacuated chamber 4 and substantially reduces the amount of gas entering the highly evacuated chamber 1.

The diffuser plate 6 is shown mounted to the conically shaped member 14 by two screws 15 and, as is clear from FIGURE 2, has a centrally raised portion. The shape of the diffuser plate may, however, take many different forms and is not restricted to the size shown in FIGURE 2. Other embodiments of the diffuser plate may be observed in FIGURES 4 and 6.

Figure 3:
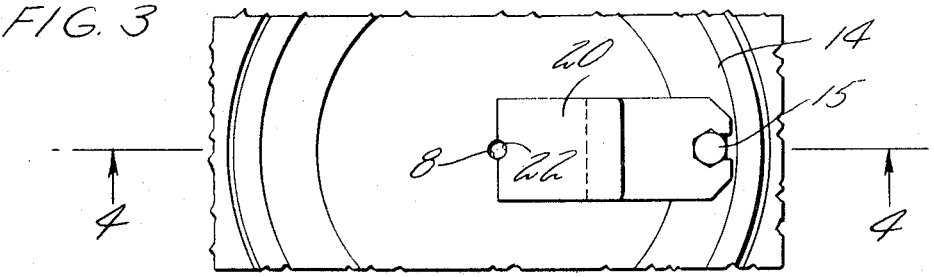
FIGURE 3 shows the top view of a second embodiment of this invention.
Figure 4:
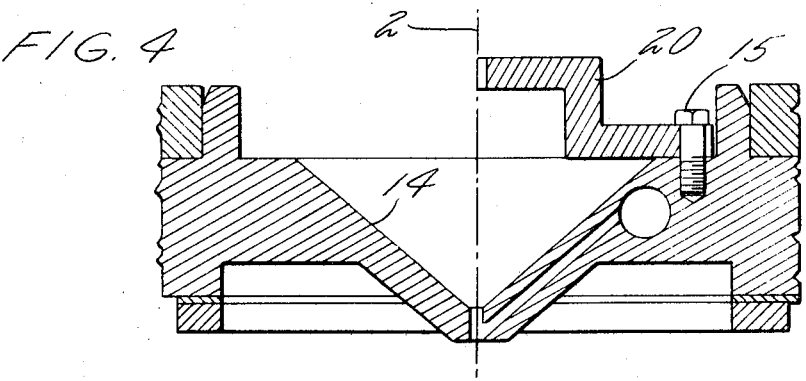
FIGURE 4 shows the side view of the embodiment of FIGURE 3.

In FIGURE 4 the diffuser plate 20 is shown together with its top view in FIGURE 3. The plate in this instance is cantilever mounted on one side of the conical member 14 and is provided with a small recess 22 to at least partially surround the electron beam 2. The member is shown with a centrally raised portion but diffuser plate 6 shown in FIGURE 2 can also be a flat plate.

Figure 5:
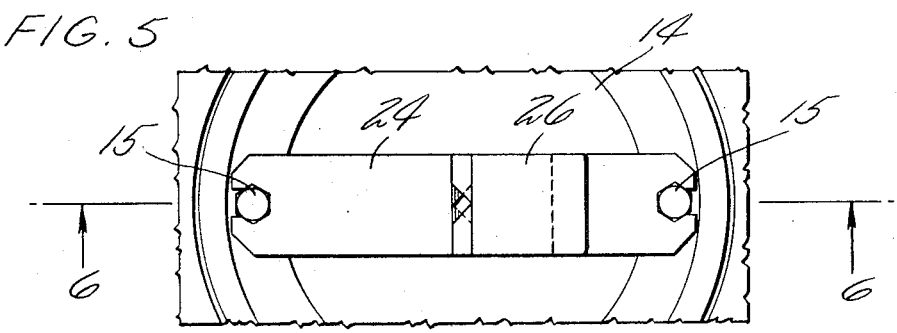
FIGURE 5 shows the top view of a third embodiment of this invention.
Figure 6:
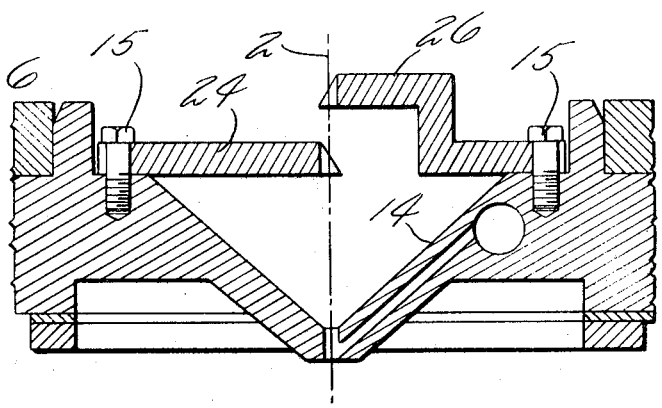
FIGURE 6 shows the side view of the embodiment of FIGURE 5.

In FIGURE 6 a diffuser plate arrangement consisting of two portions 24 and 26 are shown. The two portions as shown in FIGURE 5 partially overlap. Each portion is provided with a small recess so that the overlapping combination in the top view of FIGURE 5 gives the appearance of a diffuser plate of the type shown in FIGURE 2. The advantage of this arrangement is the axially disposed positions of the two portions 24 and 26. The diffusion of the jet stream entering through the aperture 8 can be considerable. It is not essential that each portion contains a partial recess since, for instance, the portion 24 may contain a hole directly in line with the electron beam 2 and project slightly beyond the beam and the portion 26 is then positioned axially from the portion 24 and terminates at a point adjacent to the beam 2.

By providing each of the portions of the diffuser plate of FIGURE 6 with a beveled edge adjacent the electron beam, each of the apertures in the diffuser plate embodiments shown in this invention may be provided with a bevel interior to enhance the diffusion of any gas that may tend to flow through these apertures.

In operation, each of these diffuser plate arrangements provide a substantial improvement in the pressure of the highly evacuated chamber 1. The improvement will vary with each of these embodiments depending upon the spacing from the aperture 8. Too close a spacing to the aperture 8 might tend to produce a high pressure region under the diffuser plate whereas too distant spacing may inadequately diffuse the stream of gas. When properly adjusted, the diffuser plate disrupts the flow of gas and improves its diffusion into the chamber 4 with subsequent removal by the pumping mechanism operating on the chamber 4. Improvements in the vacuum obtainable in the chamber 1 as a result of the inclusion of the diffuser as previously described may be as much as a factor of 10, and the additional cathode life provide by such a reduction in the vacuum can be considerable. Further, the pumping of the chamber 4 is accomplished at a higher efficiency and the pumping capacity in the chamber 1 may even be reduced.

In the event various chambers are cascaded, it is of course entirely possible to provide each of these chambers with a diffuser plate and thereby improve the pumping capacity of the cascaded system.

Although the member 14 through which the electron beam 2 leaves the chamber 4 is conically shaped, it is not restricted to this shape and may even be a flat plate. In such a case, the transverse flow provided by the high pressure source 12 may be either provided by means of a tube connected at an angle to the aperture 8 or may be dispensed with in the event the mechanism described in FIGURE 9 of the patent to Steigerwald, No. 2,793,281, is used.

In the event a source of charged particles is produced from a cathode operating in the abnormal glow discharge region, it is evident that higher pressures from $10^{-3}$ to 1 torr may be required at the cathode. In such case the working of materials located in a vacuum of, for instance, $10^{-3}$ torr is rendered quite difficult because of the tendency of the gas around the cathode to flow into the environment of the materials. This invention may then be used to advantage and improve the pumping of the higher vacuum by selectively spacing a diffuser mechanism of the type herein described from the aperture where the beam emerges into the chamber in which the diffuser is located.

It is to be understood that the inventon is not limited to the specific embodiments herein illustrated and described but may be used in other ways without departure from its spirit as defined by the following claims.

We claim:
1. An apparatus for the working of materials with a beam of charged particles comprising:
  means for generating a beam of charged particles,
  a first evacuated chamber,
  a second evacuated chamber,
  wherein said first chamber contains at least a portion of said beam generating means and having an opening therein for the transmission of said beam toward said second chamber,
  said second chamber postioned to receive the beam generated in said first chamber and being evacuated to a first pressure and provided with an exit wall having an aperture aligned with said beam, said exit wall aperture in communication with a gaseous environment having a second and higher pressure than said first pressure in said second chamber thereby causing a stream of gas to flow from said gaseous environment into said second chamber, and
  diffusion plate means supported in the second chamber selectively spaced between the first chamber opening and said exit wall aperture, positioned substantially transverse to the stream of gas and aligned with the beam for diffusing said stream of gas around the plate means and into the second chamber.

2. An apparatus as recited in claim 1 wherein the diffusion plate means further comprises:
a first plate having one of its surfaces facing said exit wall where the cross-sectional area of the plate surface facing the exit wall is substantially smaller than the exit wall.

3. An apparatus as recited in claim 2 where the first plate is cantilever mounted with the cantilevered free end terminating adjacent the beam of charged particles.

4. An apparatus as recited in claim 3 where the cantilevered free end protrudes beyond the beam of charged particles and is further provided with a recess to partially enclose the beam.

5. An apparatus as recited in claim 3 where the cantilevered free end protrudes beyond the beam of charged particles and is further provided with an aperture aligned with the beam.

6. An apparatus as recited in claim 2 where the first diffuser plate is provided with an aperture in alignment with the beam of charged particles.

7. An apparatus as recited in claim 3 and further comprising:
a second cantilever mounted plate selectively spaced along the beam from the first plate and with the cantilevered free end of the second plate terminating adjacent the side of the beam of charged particles that is susbtantially opposite to the side of the beam adjacent to the first plate.

8. An apparatus as recited in claim 7 where each of the cantilevered free ends of the first and second plate is beveled.

9. An apparatus as recited in claim 7 where each of the cantilevered free ends is provided with a recess for receiving a portion of the beam and thee free ends protrude beyond the beam.

10. An apparatus for the working of materials in a gaseous environment with a beam of charged particles comprising:
means for generating a beam of charged particles,
a first evacuated chamber,
a second evacuated chamber,
where said first chamber contains at least a portion of said beam generating means and having an opening therein for the transmission of said beam toward said second chamber,
said second chamber positioned to receive the beam generated in said first chamber and being evacuated to a first pressure and provided with an exit wall having an aperture aligned with said beam, said exit wall aperture being in communication with the gaseous environment wherein the materials to be worked are located,
said gaseous environment having a second and higher pressure than said first pressure in said second chamber causing a stream of gas to flow from said gaseous environment into said second chamber,
diffusion plate means supported in the second chamber selectively spaced between the beam exit opening and said second chamber apertures positioned substantially transverse to the stream of gas and aligned with the beam for diffusing said stream of gas around the plate means and into the second chamber.
means for reducing the stream of gas comprising:
a supply of gas under pressure,
means for discharging said supply of gas across the aperture in said exit wall towards the materials in said gaseous environment and forming a pressure gradient between said exit wall aperture and said environment to reduce the stream of gas flowing into said second chamber.

11. An apparatus as recited in claim 10 where the diffusion plate means further comprises:
a first plate having one of its surfaces facing said exit wall where the cross-sectional area of the plate surface facing the exit wall is substantially smaller than the exit wall.

12. An apparatus as recited in claim 11 where the plate is cantilever mounted with the cantilevered free end terminating adjacent the beam of charged particles.

13. An apparatus as recited in claim 12 where the cantilevered free end protrudes beyond the beam of charged particles and is further provided with a recess to partially enclose the beam.

14. An apparatus as recited in claim 12 where the cantilevered free end protrudes beyond the beam of charged particles and is further provided with an aperture aligned with the beam.

15. An apparatus as recited in claim 11 where the first diffuser plate is provided with an aperture in alignment with the beam of charged particles.

16. An apparatus as recited in claim 12 and further comprising:
a second cantilever mounted plate selectively spaced along the beam from the first plate and with the cantilevered free end of the second plate terminating adjacent the side of the beam of charged particles that is substantially opposite to the side of the beam adjacent to the first plate.

17. An apparatus as recited in claim 16 where each of the cantilevered free ends of the first and second plate are beveled.

18. An apparatus as recited in claim 16 where each of the cantilevered free ends is provided with a recess for receiving a portion of the beam and the free ends protrude beyond the beam.

19. An apparatus for the working of materials with a beam of charged particles comprising:
means for generating a beam of charged particles,
a first evacuated chamber,
a second evacuated chamber,
where said first chamber contains at least a portion of said beam generating means and is evacuated to a first pressure and where said first chamber is further provided with an exit having an opening for the transmission of said beam therethrough to said second chamber,
said second chamber being evacuated to a second pressure below the pressure in said first chamber whereby a stream of gas flows from said first chamber through said first chamber opening into said second chamber, and
diffusion plate means supported and selectively spaced from said first chamber opening in said second chamber, positioned substantially transverse to the stream of gas and aligned with the beam for diffusing said stream of gas around the plate, means and into the second chamber.

20. An apparatus as recited in claim 19 wherein the diffusion plate means further comprises:
a plate having one of its surfaces facing said exit wall where the cross-sectional area of the plate surface facing the wall is substantially smaller than the exit wall.

21. Apparatus for the diffusion of a stream of glas flowing from an environment having a relatively high pressure comprising:
a chamber evacuated to a lower pressure than the gas pressure in said environment,
said chamber provided with a wall having an aperture in communication with said environment through which aperture the stream of gas flows, and
a diffusion plate means positioned in said chamber substantially transverse to the stream of gas and selectively spaced from the aperture for diffusing the stream of gas around the plate means and into the chamber.

(References on following page)

References Cited

UNITED STATES PATENTS

| | | | |
|---|---|---|---|
| 2,793,281 | 5/1957 | Steigerwald | 219—121 |
| 2,824,232 | 2/1958 | Steigerwald | 219—121 |
| 2,899,556 | 8/1959 | Schopper et al. | 219—121 |
| 3,156,811 | 11/1964 | Barry | 219—121 |
| 3,162,749 | 12/1964 | Peracchio | 219—121 |
| 3,171,943 | 3/1965 | Niedzielski | 219—121 |
| 3,175,073 | 3/1965 | Niedzielski et al. | 219—121 |
| 2,423,729 | 7/1947 | Ruhle | 219—121 |
| 3,174,026 | 3/1965 | Bowers et al. | 219—117 |
| 3,218,431 | 11/1965 | Stauffer | 219—121 |

FOREIGN PATENTS 1,199,416  8/1965  Germany.

RICHARD M. WOOD, *Primary Examiner.*

W. DEXTER BROOKS, *Assistant Examiner.*

U.S. Cl. X.R.

219—69